United States Patent

Frolich

[15] 3,661,505
[45] May 9, 1972

[54] METHOD OF STERILIZING APPARATUS FOR THE HEAT TREATMENT OF LIQUID PRODUCTS

[72] Inventor: Martin Frolich, Moos-Strasse 2, Gumligen, Switzerland

[22] Filed: Apr. 24, 1970

[21] Appl. No.: 31,585

[30] Foreign Application Priority Data

Apr. 28, 1969 Switzerland .......................... 6421/69

[52] U.S. Cl. .................................. 21/56, 21/94, 134/22 R, 134/23, 137/15, 137/241
[51] Int. Cl. ........................................ A61l 1/00
[58] Field of Search ................... 21/56, 57, 94; 134/22 R, 23; 137/15, 241

[56] References Cited

UNITED STATES PATENTS

| | | | |
|---|---|---|---|
| 2,338,228 | 1/1944 | Boeckefer et al. | 21/56 X |
| 2,815,289 | 12/1957 | Murray | 21/56 X |
| 2,817,606 | 12/1957 | Barrett | 134/22 R |
| 2,818,076 | 12/1957 | Erling | 134/22 UX |
| 3,254,943 | 6/1966 | Palm | 21/94 |
| 3,359,062 | 12/1967 | Palm | 21/56 |
| 3,511,706 | 5/1970 | Orr | 134/22 R X |
| 3,533,840 | 10/1970 | Holm | 134/22 R |

FOREIGN PATENTS OR APPLICATIONS

| | | | |
|---|---|---|---|
| 137,833 | 7/1947 | Australia | 21/94 |
| 576,806 | 6/1959 | Canada | 21/94 |
| 957,904 | 5/1964 | Great Britain | 134/22 R |

*Primary Examiner*—Morris O. Wolk
*Assistant Examiner*—Barry S. Richman
*Attorney*—Brady, O'Boyle & Gates

[57] ABSTRACT

A method of sterilizing apparatus for the heat treatment of liquid products comprises displacing air from the apparatus by steam, circulating hot water through the apparatus so that hot water is sprayed into a vessel and thereby heated by the steam until the steam pressure in the vessel required to reach and maintain the sterilization temperature in the coldest part of the vessel is reached and maintaining this pressure until the sterilization temperature has been maintained for a predetermined sterilization period in the coldest part of the apparatus, subsequently discontinuing the steam supply and cooling the water by a heat exchanger while supplying sterile air which maintains an excess pressure in the apparatus during subsequent discharge of the water. The apparatus is modified to allow this method to be performed.

1 Claims, 1 Drawing Figure

PATENTED MAY 9 1972  3,661,505
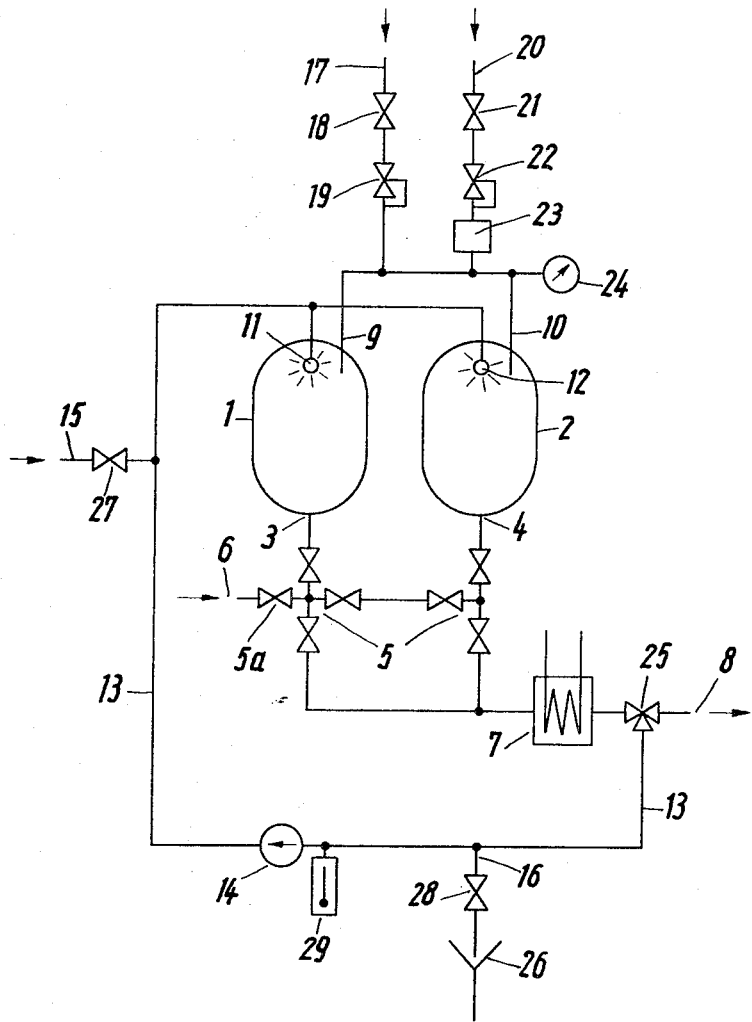
Inventor:
MARTIN FROLICH
BY Brady, O'Boyle & Gates
ATTORNEYS

METHOD OF STERILIZING APPARATUS FOR THE HEAT TREATMENT OF LIQUID PRODUCTS

The present invention relates to a method of sterilizing apparatus for the heat treatment of liquid products, e.g. bacterially soured milk products, the apparatus comprising at least one closed vessel, at least one heat exchanger and connecting pipes with valves.

The method of steam sterilization of such apparatus hitherto known requires a complicated pipe system (e.g. for the heat exchanger) with numerous steam connections and condensation water outlets in order that the required sterilization temperature can be achieved at all parts of the apparatus, and measuring devices for temperature supervision are required at numerous points in the apparatus. Hot water sterilization, which is also known, is unsuitable for large containers because of the large amount of hot water required.

It is an object of the present invention to provide a method of sterilization which overcomes or at least mitigates these disadvantages.

According to the present invention, a method of sterilizing apparatus for the heat treatment of liquid products comprising at least one closed vessel, at least one heat exchanger and connecting pipes with valves, comprises displacing air from the apparatus by steam conducted into the container, at least the major part of the pipes being filled with hot water, and circulating the water while simultaneously supplying further steam through the whole apparatus, the circulating water being sprayed into the vessel and thereby heated by the steam fed into the vessel until the steam pressure required to reach and maintain the sterilization temperature at the coldest part of the apparatus is reached in the vessel, regulating the steam supply for maintaining this steam pressure and continuing the water circulation until the sterilization temperature is reached at the coldest part of the apparatus, and is there maintained during a predetermined sterilization period, subsequently discontinuing the steam supply, cooling the circulating water by means of the heat exchanger and simultaneously supplying sterile air into the apparatus for maintaining an excess pressure until the operating temperature is reached, subsequently discharging the water and simultaneously supplying further sterile air for maintaining the excess pressure in the apparatus.

The invention will be more readily understood from the following description, given by way of example only of an apparatus for heat treatment of bacterially soured milk diagrammatically shown in the accompanying drawing and a method of sterilizing said apparatus.

The apparatus illustrated has two vessels 1 and 2 with lower connections 3 and 4, respectively and having a set of valves 5 which enable any connection to be made between the vessel connections 3 and 4, an inlet 6 of the apparatus (i.e. the inlet for the product to be treated) and an inlet of a heat exchanger 7, the outlet of which leads to an outlet 8 of the apparatus (i.e. the outlet for the treated product).

For the purpose of sterilizing the apparatus by the method to be described below pipes 9 and 10 for steam and sterile air are respectively connected to the upper ends of the vessels 1 and 2, which are provided with respective spray nozzles 11 and 12, the nozzles 11 and 12 being connected to one end of a pipe 13, the other end of which can be connected to the outlet 8 of the apparatus and which is provided with a pump 14 and is connected to a supply pipe 15 for hot water and an outlet pipe 16.

A steam supply pipe 17 is provided with an adjustable valve 18 and a pressure regulating valve 19. An air supply pipe 20 is provided with an adjustable valve 21, a pressure control valve 22 and an air heater 23 serving to sterilize the air. A manometer 24 is provided for checking the steam and air pressure. The pipe 13 can be connected by a three-way valve 25 to the outlet of the heat exchanger 7 and the outlet 8. In the hot water supply pipe 15 and in the outlet pipe 16, which is connected to the lowest part of the apparatus and leads to a discharge funnel 26, there are respectively arranged valves 27 and 28.

At the part of the apparatus at which the lowest temperature prevails when hot water, as described below, circulates through the apparatus, there is provided a thermometer 29. The lowest part is ascertained by experiment; in the drawing it is assumed that it is at the inlet to the pump 14.

This apparatus serves for thermal treatment of bacterially soured milk which is supplied from the inlet 6 by appropriate adjustment of the valves 5 to one of the vessels 1 and 2 and which is supplied from one of these vessels through the heat exchanger 7, in which the heat treatment takes place, to the outlet 8 of the apparatus, the valve 25 disconnecting the pipe 13 from the outlet 8, the valves 18, 27 and 28 being closed, and the valve 21 being open in order to maintain an excess pressure in the apparatus which prevents the entry of germs.

For sterilizing the apparatus, when it is empty, the valve 21 and the valve 5a of the set of valves 5, which is connected with the inlet 6, are closed, and all other valves of the set of valves 5 and valve 28 are opened. The three-way valve 25 is adjusted so that the pipe 13 is connected with the outlet of the heat exchanger 7 and is disconnected from the outlet 8. The valve 18 is then opened and steam is supplied through the pipes 9 and 10 into the vessels 1 and 2 and into the other parts of the apparatus to displace the air. The air escapes through the outlet pipe 16. When steam flows out to the discharge funnel 26, the valve 28 is closed and the valve 27 is opened in order to fill the pipes with hot water. The pump 14 is then operated to circulate the hot water through the pipe 13, the containers 1 and 2, the set of valves 5 (with the exception of the closed valve 5a), the heat exchanger 7 and the flow path determined by the three-way valve 25. During this circulation the hot water is sprayed from the spray nozzles 11 and 12 so that it in practice reaches the whole of the walls of the vessels. The hot sprayed water is thereby further heated by the steam entering the vessels so that the temperature of the water and the steam pressure in the vessels will gradually increase as the sterilization process progresses. Because of the unavoidable cooling of the circulating water, this temperature is not constant along the path of circulation. The path of circulation has a position of lowest temperature, which in the illustrated example is, as mentioned above, at the inlet to the pump, 14. When this position has reached the predetermined sterilization temperature, the temperature and the pressure in the containers 1 and 2 have predetermined values which can be ascertained by experiment. During sterilization of the apparatus, the steam supply is so controlled by adjustment of the regulating valve 19 that this predetermined steam pressure is reached and is subsequently maintained until the coldest position of the apparatus has reached the sterilization temperature. Thereafter, this predetermined steam pressure is further maintained during a predetermined sterilization period, the temperature at the coldest position being checked by means of the thermometer 29 and the steam pressure being checked at the manometer 24. After the expiry of the sterilization period, the steam supply is discontinued but the water circulation is maintained and the circulating water is cooled by the heat exchanger 7. Simultaneously, sterile air for maintaining an excess pressure is supplied to the apparatus through the pipes 9 and 10 from air supply pipe 20. When the circulating water has been cooled to the operating temperature of the apparatus, the valve 28 is opened in order to allow the water to escape and simultaneously further sterile air for maintaining an excess pressure is supplied through the pipes 9 and 10 into the apparatus and the pump 14 is stopped. When the water has flowed out, the valve 28 is closed. The apparatus is then sterile and remains sterile since the excess pressure prevailing in the apparatus prevents the entry of germs.

In the above-described sterilization, it is sufficient to maintain the steam pressure constant at a single portion of the apparatus to be sterilized, namely in the vessels, and to check the temperature at a single position. Since in the apparatus the water is sprayed during circulation through the vessels, a relatively small amount of water is sufficient even for large vessels.

Since a relatively small amount of water is used in the process it results in rapid heating and the heat used both during heating of the water and also during the maintenance of the temperature thereof during the sterilization period is relatively small. Also, the cooling, during which the heat exchanger already provided in the apparatus for heat treatment of the products is employed, takes place rapidly and requires no additional expenditure on apparatus.

I claim:

1. A method of sterilizing an apparatus for heat treatment of liquid products at an operating temperature including at least one closed vessel, a heat exchanger and connecting pipes with valves, which method comprises the steps of establishing a dwell period during which the sterilization temperature must be maintained to effect sterilization, displacing the air in the apparatus by steam supplied into the said closed vessel, filling at least the major part of the pipes with hot water, circulating said hot water through the whole apparatus while simultaneously supplying further steam, spraying said hot water into said closed vessel during the circulation thereof, heating said hot water during the spraying with the steam supplied to the closed vessel until the steam pressure in the vessel required to reach and maintain the sterilization temperature at the coldest position of the apparatus is reached, controlling the steam supply for maintaining this steam pressure and continuing the hot water circulation until the sterilization temperature is reached at the coldest position of the apparatus and until the temperature at said position does not fall below the sterilization temperature during the predetermined dwell period, thereafter discontinuing the steam supply, cooling the circulating water by means of the heat exchanger, simultaneously supplying sterile air into the apparatus for maintaining an excess pressure until the operating temperature of the apparatus is reached and thereafter discharging the water and simultaneously supplying further air into the apparatus to maintain the excess pressure.

* * * * *